United States Patent [19]

Laing et al.

[11] Patent Number: 4,471,835

[45] Date of Patent: Sep. 18, 1984

[54] HEAT TRANSFER PUMP

[76] Inventors: Karsten Laing, Kaiserallee 51, 7500 Karlsruhe; Oliver Laing, Weissdornweg 14, 7400 Tübingen, both of Fed. Rep. of Germany; Ludwig Ludin, Kesselackerweg, 5611 Anglikon, Switzerland

[21] Appl. No.: 358,808

[22] Filed: Mar. 16, 1982

[30] Foreign Application Priority Data

Mar. 16, 1981 [CH] Switzerland .................. 1753/81

[51] Int. Cl.³ .................. F28F 9/24; F28F 13/12
[52] U.S. Cl. .................. 165/109 R; 165/163
[58] Field of Search .................. 165/109 R, 132, 163

[56] References Cited

U.S. PATENT DOCUMENTS

| 886,518 | 5/1908 | Klementis et al. | 165/109 |
| 1,791,528 | 2/1931 | Hall | 165/132 X |
| 3,302,700 | 2/1967 | Dugan | 165/109 |
| 3,517,732 | 6/1970 | Brebant | 165/109 |
| 3,934,857 | 1/1976 | Hege | 165/109 R |

FOREIGN PATENT DOCUMENTS

| 516704 | 1/1931 | Fed. Rep. of Germany | 165/109 |
| 15558 | 2/1898 | Switzerland | 165/109 |
| 2085143 | 4/1982 | United Kingdom | |

Primary Examiner—Sheldon J. Richter
Attorney, Agent, or Firm—Pennie & Edmonds

[57] ABSTRACT

A centrifugal circulation pump for a fluid heat carrier where the pump has a housing including a centrifugal impeller, an inlet pipe for admitting a first heat carrier into the housing and a discharge pipe for discharging the first heat carrier from the housing. A heat transfer means in the form of a tubular coil is positioned in the housing through which a second heat carrier flows. The centrifugal impeller moves the first heat carrier with a swirl motion in a direction parallel to the turns of the coil whereby heat is exchanged between the first and second heat carriers.

2 Claims, 5 Drawing Figures

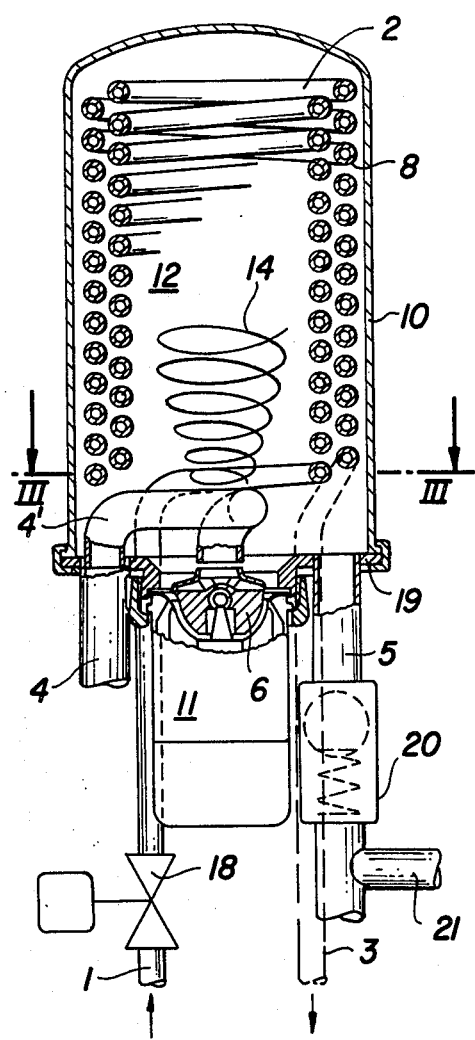
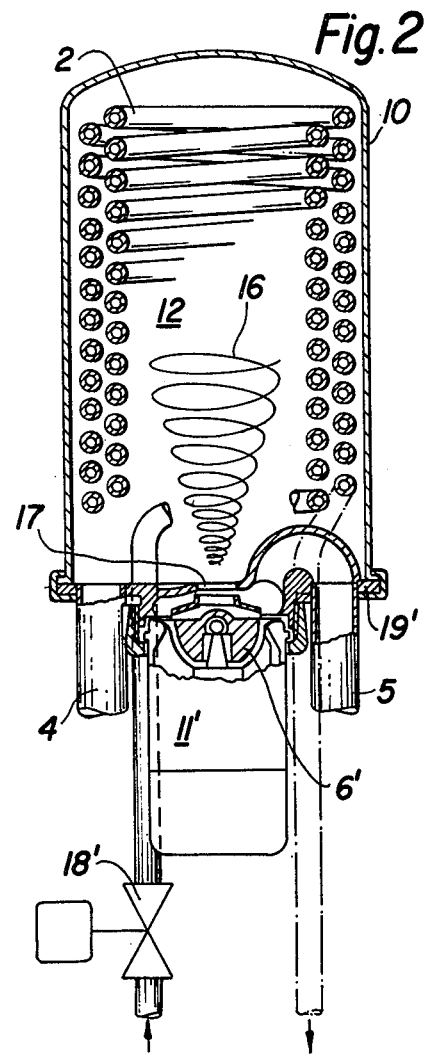
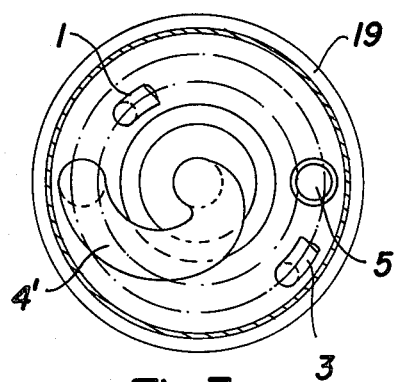
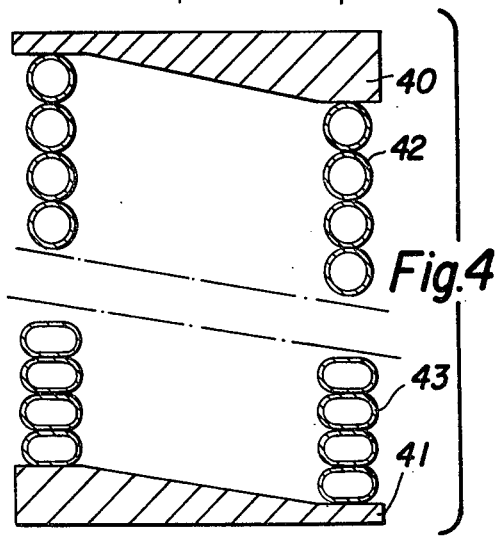

HEAT TRANSFER PUMP

The invention relates to a pump for the circulation of liquid which pump contains heat transfer elements. The heat transfer means of the type liquid-to-liquid are generally made as pine coils through which is forced the heat transfer liquid at as high a velocity as possible to achieve high heat transfer parameters. Such heat transfer circuits have therefore a high hydraulic resistance so that they require high pumping pressures. Porportionally with the pumping pressure raises also the necessary motor output and with it the yearly consumption of electric current. Because heat transfer means are often used particularly in heating equipment, in which they are often in operation the whole year round this leads to significant energy costs.

The invention avoids these energy costs resulting from friction in pipes in that the heat transfer means is provided in the pump housing. In this way are usefully used the unavoidable losses due to whirl, which every centrifugal pump has, because the whirl also causes increase in the convective heat transfer on the heat emitting side of the heat transmitting pipes. This makes, in addition, a separate heat transfer housing unneccesary. A further improvement of the heat transfer is obtained in that the heat transfer means are made with a flat cross-section. For this purpose is made, according to the invention, a pipe coil from a circular pipe by conventional manufacturing methods. Then the pipe coil is axially compressed whereby all pipes acquire uniformly a cross-section in the form of a rounded oblong, whereupon the pipe coil is again slightly extended in axial direction. In the same pump space may be arranged a significantly larger surface.

The invention will be explained in more detail with reference to figures.

FIG. 1 shows, in longitudinal section, a pump according to the invention in which heating water is forced through a pipe coil arranged in the cylindrical outlet space of the pump.

FIG. 2 shows, in longitudinal section, an arrangement in which the pipe coil is arranged in the suction space of the pump.

FIG. 3 shows a section along line III—III.

FIG. 4 shows a method step for the manufacture of the coil.

Figure 5:
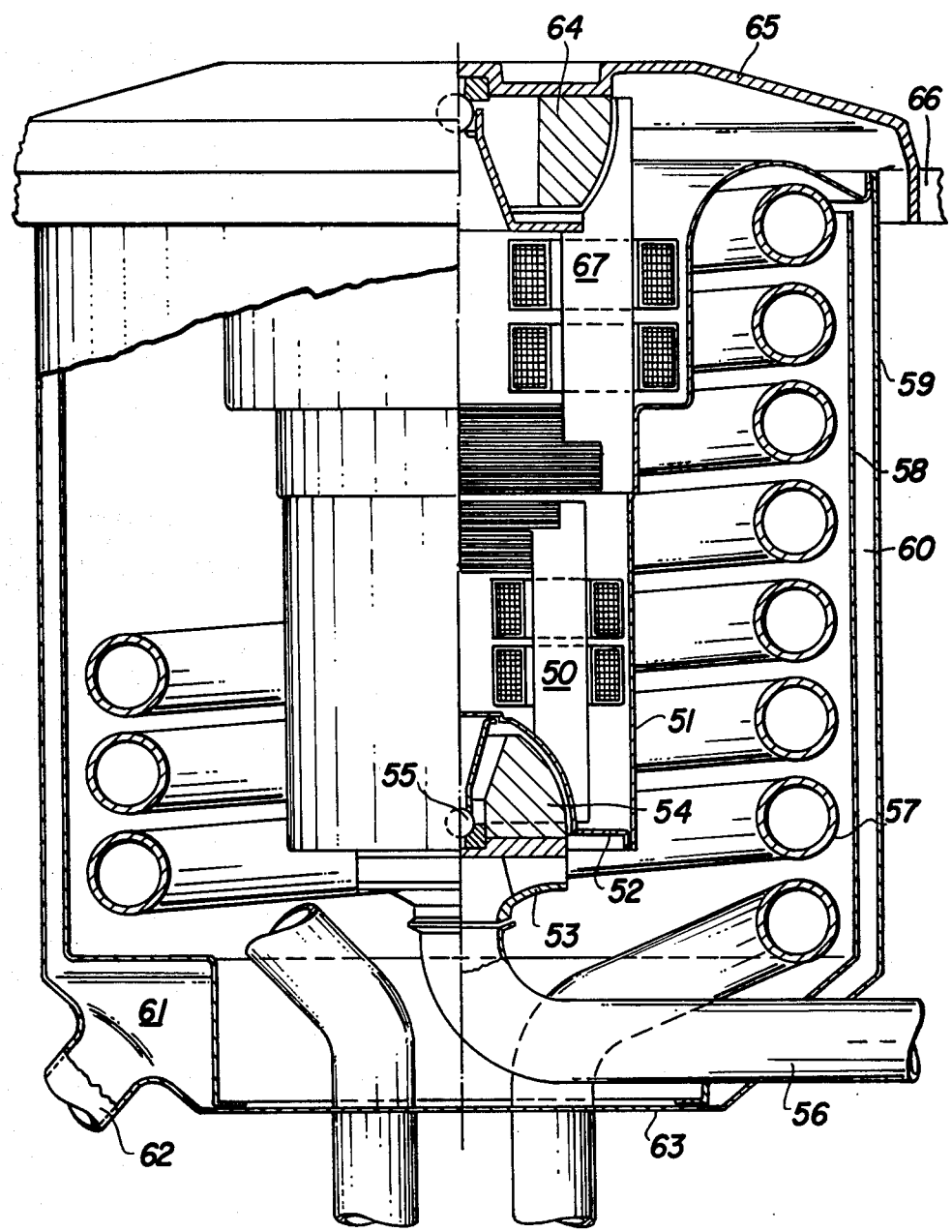
FIG. 5 shows a condenser for heat pumps.

FIG. 1 shows a pump according to the invention in longitudinal section. Water of the heating circuit, which is circulated by a heat pump, enters pipe 1 and flows through the pipe coils 2 comprising inner and outer coil sections which are connected in a series, which it leaves through the pipe 3. The pipe coils are arranged concentrically in a cylindrical pump housing 10 near the outer periphery thereof, so that a cylindrical inner space 12 is left free. The large-surface heating is connected with the pump 11 or 11' by pipes 4 and 5. The velocity of flow of water in the pipe and at its surface is 0.5 to 3 m/s, because in spite of the large cross-section of the housing 10 a large relative velocity parallel to the pipes 8 is produced, because the pump impeller is so arranged that the outlet whirl 14 spreads along the coil 8 which is twisted in the same direction. By the high relative velocity of the liquid in the cylindrical space 12 relative to the coil pipes 2 is ensured a high heat transfer.

In the embodiment according FIG. 2 the suction region 17 of the impeller 6' communicates with the inside of the housing 10 and produces in this manner on the suction side a whirl flow 16.

In the embodiment of FIGS. 1 and 2 the inlet pipe 4, impeller 6 and outlet pipe 5 form part of a circuit for a first fluid heat carrier while the pipe 1, tubular coil 8 and pipe 3 form part of a circuit for a second fluid heat carrier.

In FIG. 3 is illustrated a cross-section along line III—III in FIG. 1, from which is apparent the embodiment of the suction pipe 4', which is also helical for adaptation to the flow. The suction pipe may, however, also form a unit with the bottom region 19 of the pump housing 10. In this case all connections 1, 3, 4 and 5 should pass through the bottom.

In order to control the temperature a valve 18 may be provided in the primary circuit. Another kind of regulation consists in that the pump motor is driven intermittently while the impulse-pause ratio equals one only at the nominal output and decreases with a reduction in the actual heat consumption. The length of the impulse is preferably so chosen that the water contents of the hollow body forming the large-surface heating is always exchanged. In order to simplify filling, a non-return valve 20 is situated downstream of the outlet pipe 5 so that water entering through the port piece 21 flows through the large-surface heating.

FIG. 4 shows a device in which two formpieces 40 and 41 are inserted under a press (not shown) and deform the pipe of the pipe coil 42 to the shape 43. After being removed from the device the pipe coil which has been flattened must be to a small extent axially spread to obtain spacing between adjacent turns.

FIG. 5 shows another embodiment which is particularly suitable as a condenser for air-water heat pumps. The pump motor 50 is arranged in a sleeve 51 which is with respect to the water side sealed by a partition 52. The impeller 53 forms a rotatable unit with a ring-shaped magnet 54. The impeller is pressed by the force of the permanent magnets against a bearing ball 55. The water to be heated enters through the pipe 56, the heat transfer means 57 being arranged in the region of the outlet vortex of the pump impeller 53. Between the cylinder 58 and the housing 59 is formed an annular space 60 which merges into a collection space 61. With this connection space communicates an outlet port piece 62. The heat transfer means pipe 57 passes at the bottom 63 through the wall of the housing 59. In the same sleeve 51 may be situated a second motor 67, the rotor of which drives a wheel disc 65 which merges into wings 66 and forms in this way an axial fan for the evaporator (not shown) of the heat pump. The whole loss heat of the motors 50 and 67 is transferred to the utility water via the sleeve 51. If the apparatus is used as a desuperheater for utilizing heat from hot steam in cooling devices, the motor 67 is not needed.

We claim:

1. A circulation pump for a fluid heat carrier comprising a pump housing having a first fluid heat carrier inlet through which a first heat carrier is discharged into said housing and a first fluid heat carrier outlet through which said first fluid heat carrier is discharged from said housing, a centrifugal impeller communicating with said first fluid heat carrier inlet and discharging said first fluid heat carrier into said housing with a whirl motion, and heat transfer means in said housing in the form of a helical tubular coil through which a second fluid heat carrier flows having a plurality of turns and having a second fluid heat carrier inlet and a second fluid heat carrier outlet both connected to a side of said housing with the direction of the turns of said coil being substantially in the same direction of said whirl whereby substantially the complete length of the coil is subjected to the whirl motion of the first heat carrier.

2. A circulation pump according to claim 1 wherein said coil comprises an inner coil section in series connection with an outer coil section concentrically within the housing and the outer coil section extending substantially to the periphery of said housing.

* * * * *